UNITED STATES PATENT OFFICE.

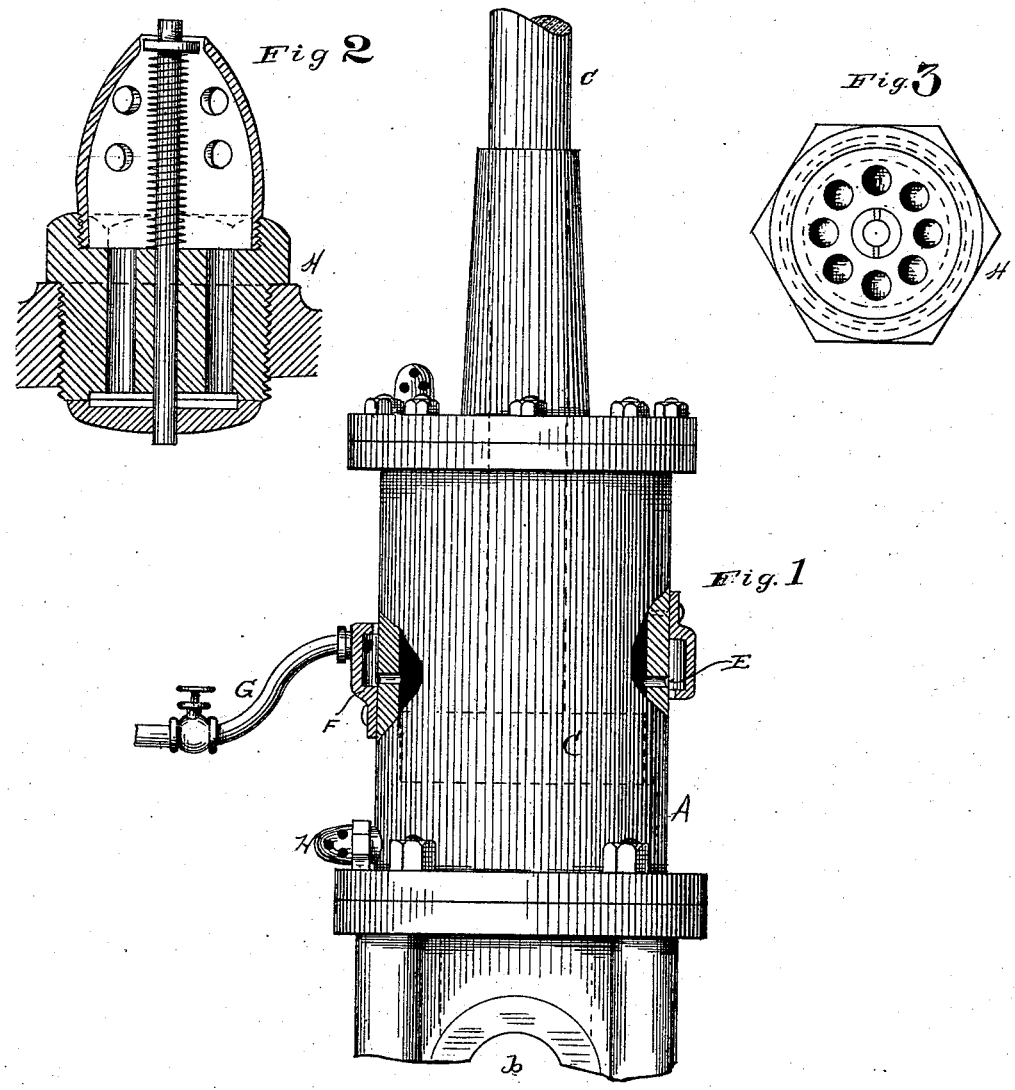

JOHN C. BUTTERFIELD, OF CHICAGO, ILLINOIS.

ATMOSPHERIC HAMMER.

SPECIFICATION forming part of Letters Patent No. 290,850, dated December 25, 1883.

Application filed July 30, 1883. (No model.)

*To all whom it may concern:*

Be it known that I, JOHN C. BUTTERFIELD, of Chicago, Cook county, in the State of Illinois, have invented a new and useful improvement in lubrication of the piston in the transmitting air-cylinder employed on my atmospheric hammer and stamp-mill, (for which Letters Patent were granted to me, Nos. 176,400, 230,611, 264,859, 264,860, &c.,) of which the following is a specification.

In the machines referred to in said Letters Patent motion from the main crank is transmitted to the operative mechanism by means of compression of air alternately in the ends of a cylinder; and this improvement relates to a new way of lubricating the piston within said cylinder, whereby the expense and mechanical objections to the use of ordinary lubricants are entirely avoided, and a better result is attained. The lubricant I employ is water supplied in constant or intermittent stream, as preferred, and in such quantity as experience shall show to be proper.

That others may fully understand my improvement, I will particularly describe it, reference being had to the accompanying drawings, wherein—

Figure 1 is a side elevation of my cylinder, partly in section. Fig. 2 is a vertical section of the air-valve. Fig. 3 is a plan of the same without the cap.

A is the cylinder, which, in the machines referred to, is mounted upon the main crank, *b* being the cylinder-bearing for the same.

C is the piston, that part within the cylinder shown by dotted lines. It will be understood that the mounting of the cylinder upon the crank instead of the piston is a matter of preference, either way being feasible. The upper end of the piston-rod is jointed to the walking-beam or other operative part of the machine, whereby power and motion may be transmitted. The reciprocation of the cylinder at each revolution of the crank causes the piston to move from one end thereof to the other, compressing the air in front of it until the resistance thereby produced causes the piston to move with the cylinder, and thereby actuate the mechanism through the elastic resistance of the air compressed within the cylinder.

It is obviously necessary to lubricate the piston, and lubricating-oils are found to be unsatisfactory, because they rapidly gum under the conditions of heat and pressure to which they are subjected, because, as is well known, the sudden compression of air under the conditions prevailing in the cylinder A causes a rapid generation of heat, which must be dissipated in some way, or it would soon cause destruction of packing and other disasters. I have therefore employed water as a lubricant with results entirely satisfactory, and in the manner as follows:

Vent-holes E are made in the side of the cylinder at about its middle of length, so that compression shall not commence in one end of the cylinder until expansion has ceased in the other. I cover one of these vent-holes with a shield-plate, F, with its free edge upward, and connect therewith a small water-pipe, G, through which a proper stream of water may be directed into the space within said jacket; thence it flows through the vent and lubricates the piston. It also tends to cool the cylinder. A portion of this water will find its way within the cylinder, above and below the piston, though experience will teach the attendant to gage the quantity properly. That which passes in above the piston will be partly expelled directly as the piston rises in the cylinder. That which passes in below the piston will be partly converted into vapor by the heat and fluctuations of pressure, and partly discharged through the valve H, when the same opens to relieve partial vacuum in the cylinder, and thereby aqueous accumulations in the cylinder will not occur.

The vacuum relief-valve H affords a ready means for drawing off any water which may condense in the cylinder when the machine is at rest.

Having described my invention, what I claim as new is—

1. An air cylinder and piston for transmitting power by means of air-compression in said cylinder, as described, combined with a device for feeding water at the middle of the cylinder to lubricate the piston, as set forth.

2. The piston C and the cylinder A, provided with the vent-holes E and shield F, combined with the water-feed pipe to conduct water to the space within said shield, for the purpose set forth.

3. The piston C and the cylinder A, provided with the vent-holes E and shield F, combined with a flexible water-pipe, G, connected at one end to said shield and at the other end to a stationary supply-pipe provided with a controlling-valve.

4. The piston C and the cylinder A, provided with a water-supply pipe discharging at the middle of said cylinder, as shown, combined with the vacuum relief-valve H, whereby surplus water in the lower end of the cylinder may escape.

JOHN C. BUTTERFIELD.

Witnesses:
S. E. W. MARTIN,
W. D. REYNOR.